(12) United States Patent
Gil et al.

(10) Patent No.: US 7,315,542 B2
(45) Date of Patent: Jan. 1, 2008

(54) HANDLING AND DISCARDING PACKETS IN A SWITCHING SUBNETWORK

(75) Inventors: Mercedes E Gil, Fort Collins, CO (US); S. Paul Tucker, Ft Collins, CO (US); Edmundo Rojas, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1001 days.

(21) Appl. No.: 10/261,012

(22) Filed: Sep. 30, 2002

(65) Prior Publication Data

US 2004/0062244 A1    Apr. 1, 2004

(51) Int. Cl.
*H04L 12/28* (2006.01)
*H04L 1/18* (2006.01)

(52) U.S. Cl. .................. 370/392; 370/252; 370/412; 370/389; 714/748

(58) Field of Classification Search ................. 370/244
See application file for complete search history.

(56) References Cited

U.S. PATENT DOCUMENTS

| 4,862,461 | A * | 8/1989 | Blaner ........................ 714/749 |
| 5,307,345 | A * | 4/1994 | Lozowick et al. ........... 370/428 |
| 5,926,473 | A * | 7/1999 | Gridley ....................... 370/389 |
| 6,922,749 | B1 * | 7/2005 | Gil et al. ..................... 710/316 |

OTHER PUBLICATIONS

"InfiniBand Architecture Specification," vol. 1, Release 1.0, Oct. 24, 2000.*
Lionel M. Ni, Wenjian Qiao, and Mingyao Yang, "Switches and Switch Interconnects," Department of Computer Science, Michigan State University, East Lansing, MI 48824-1027.*

* cited by examiner

*Primary Examiner*—Steven Nguyen

(57) ABSTRACT

A method and structure for the handling and discarding of packets in a packet data network. The method includes a packet data network receiving one or more packets from one or more remote locations and initiating a transfer of a packet of the one or more packets to a remote destination. The remote destination is operable to act as a destination port of a switch. The transfer of the packet is initiated while the packet of the one or more packets is being received, and the packet validity is also checked while the transfer of the packet is initiated. If the packet is invalid, the transfer of the packet of the one or more packets to the remote destination is canceled. Determining packet validity includes inspection of a packet header. The structure has a receive link determining packet validity and passing this error signal to a packet processor. The packet processor has a packet transfer request generator, a packet checker, packet reader, packet memory and tag memory. The packet transfer request generator initiates a transfer request over a switch with a remote destination. While the request is processed, the packet checker verifies packet correctness and stores the packet data for transmission to the remote destination. If a packet is in error, a bad tag is set and the packet transfer is aborted.

33 Claims, 6 Drawing Sheets

HANDLING AND DISCARDING PACKETS IN A SWITCHING SUBNETWORK

TECHNICAL FIELD

This invention relates generally to the field of network technology, and more specifically to a method of processing packets in a switching system.

BACKGROUND OF THE INVENTION

Since 1991, when the PCI bus was introduced as one of the first industry standards for input/output and peripheral communications, most computer system architectures have utilized PCI for input/output (I/O) communications. During the time that the PCI standard has gained wide acceptance, the performance capabilities of the typical computer system have drastically improved. The increases in computer performance and the associated demands placed upon computer networks by end users have rapidly exceeded the capabilities for which the PCI bus was designed. Expensive high-end servers, database access systems, and network switches have addressed the shortcomings of the PCI standard through the creation of specialized and proprietary data transfer architectures. Newer, faster versions of the PCI architecture are also common, but these have the same inherent disadvantage of the PCI bus in that a parallel architecture is used. With the anticipated continued growth of demand for data services over the internet and in computer-computer communications, a new long-term solution was needed.

One proposed solution is the Infiniband architecture. Infiniband is a joint effort of several computer and peripheral manufacturers, including IBM, Intel, Compaq, HP, Dell, Microsoft and Sun Microsystems. The Infiniband specification describes an interconnect technology that enables processor nodes and input/output nodes to be joined together to form a system area network. The Infiniband architecture, if properly designed, is independent of the type of operating system and the processing platform used. This architecture is partially based upon the observation that with the needs for greater bandwidth and lower data latency, the input/output devices in a network have become more complex and have increased processing capabilities.

Referring to FIG. 1, a high-level diagram of one subnetwork of the Infiniband Architecture 100 is shown. The Infiniband architecture is designed using an extensive I/O switched network. The subnetwork shown in FIG. 1 uses a point-to-point switching network, where each switch may be linked to one or more processing nodes, routers, I/O devices, and data storage devices. This type of link connectivity may be characterized as module-to-module or chassis-to-chassis, depending upon whether the links are within a larger subsystem or are links between subsystems. The collection of switches is called the Infiniband switching fabric, or just fabric. The fabric is the heart of the Infiniband architecture and processing devices may be coupled to this fabric in a variety of ways. Typically each device coupled to the fabric has a channel adaptor interface. The Infiniband specification specifies two types of channel adaptors; the Host Channel Adaptor (HCA) and the Target Channel Adaptor (TCA). The HCA is designed for nodes that require more processing capability. The TCA is typically designed to support input/output devices. Both the TCA and HCA manage the transport level interactions with the switching fabric.

Referring now to FIG. 2, a more detailed diagram of a channel adaptor is shown, according to the prior art. Channel adaptors are used in the Infiniband architecture to generate and consume packets. These channel adaptors are present in the form of TCA's and HCA's. A channel adaptor allows devices external to the Infiniband specification access to data through a programmable direct memory access (DMA) engine. This DMA access may be executed locally or remotely. A channel adaptor may have multiple ports as shown in FIG. 2. Each port is coupled to the transport functionality using one or more Virtual Lanes (VLs). Each VL provides it's own buffering flow control so that each port can send and receive data packets simultaneously.

Referring now to FIG. 3, a more detailed diagram of an Infiniband switch is shown, according to the prior art. The switches specified in the Infiniband architecture generate or consume data. Packets received by the switch are forwarded to the destination address specified in the packets routing header. Thus, the utility of switches in the Infiniband architecture is the ability to interconnect links using switches to relay packets between the links. Switches are not directly addressed from the point of view of the end user. Instead, packets traverse a subnetwork transparently through the use of unique identifiers (LIDs). The switch forwards individual packets to an outgoing port using the value specified in the LID. One or more ports that may be used for incoming and outgoing relay functionality are coupled to the switch through one or more Virtual Lanes. In general, Infiniband switches support unicast or multicast routing. In unicast routing, a single packet is delivered to one destination, while multicast routing delivers a single packet to multiple destinations.

In many switching implementations, a packet is transferred out of a switch using a multiple-cycle request/arbitration/grant operation. During the request phase, the switch queries a destination port, with a request to transfer the packet. The arbitration phase begins with the switch and the destination port exchanging transport information. Based upon the transport parameters of the packet, the packet is granted with a certain quality of service level. From the point of view of the destination port, the arbitration process is a method to handle multiple incoming requests received and to select the appropriate requests that will be granted. If the two sides can agree on the parameters for transport of the packet, the grant phase begins and the switch starts the process of sending the packet to the destination port.

If the packet has a requirement for low-latency, then the entire portion of the request/arbitration/grant cycle that does not involve the actual transmission of the packet to the destination port increases the latency of the packet. Techniques for minimizing this latency include complex arbitration algorithms as well as techniques that start the transport of the packet while the packet is still being received by the switch.

In latency-sensitive systems, it is highly desirable to have switches operate in cut-thru mode. That is, switching logic begins transferring a packet out of a switch while the switch is still receiving the packet. This becomes a difficult problem when protocol requires that error packets be discarded or marked bad, while performance requires low latency packet transfers. There is a need in the art for an approach that is able to handle and discard packets even if the switch may have not received the entire packet and checked it for errors prior to starting the request/arbitration/grant cycle that sends the packet to the destination port.

SUMMARY OF THE INVENTION

The present invention provides for the handling and discarding of packets in a packet data network. A device, such as an Infiniband switch, receives packets from a remote location, such as a destination port, and initiates a transfer of the packet to a second remote location. This transfer is initiated while the packet is still being received. The device checks the packet validity while the transfer of the packet to the remote location is being initiated, and, if the packet is invalid, the transfer of the packet to the remote location is canceled. If the device has already started the transfer process, then the packet is truncated and marked as bad. In this latter case only a few extra words are transmitted to the remote location. The device may also support a store and forward operation. In this case, if an error occurs, a store-and-forward error packet allows one or more parts of the packet to be transferred to an output link before being truncated and marked bad. Any remaining parts of the packet previously stored in the input buffer will be discarded and will not consume output link bandwidth.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
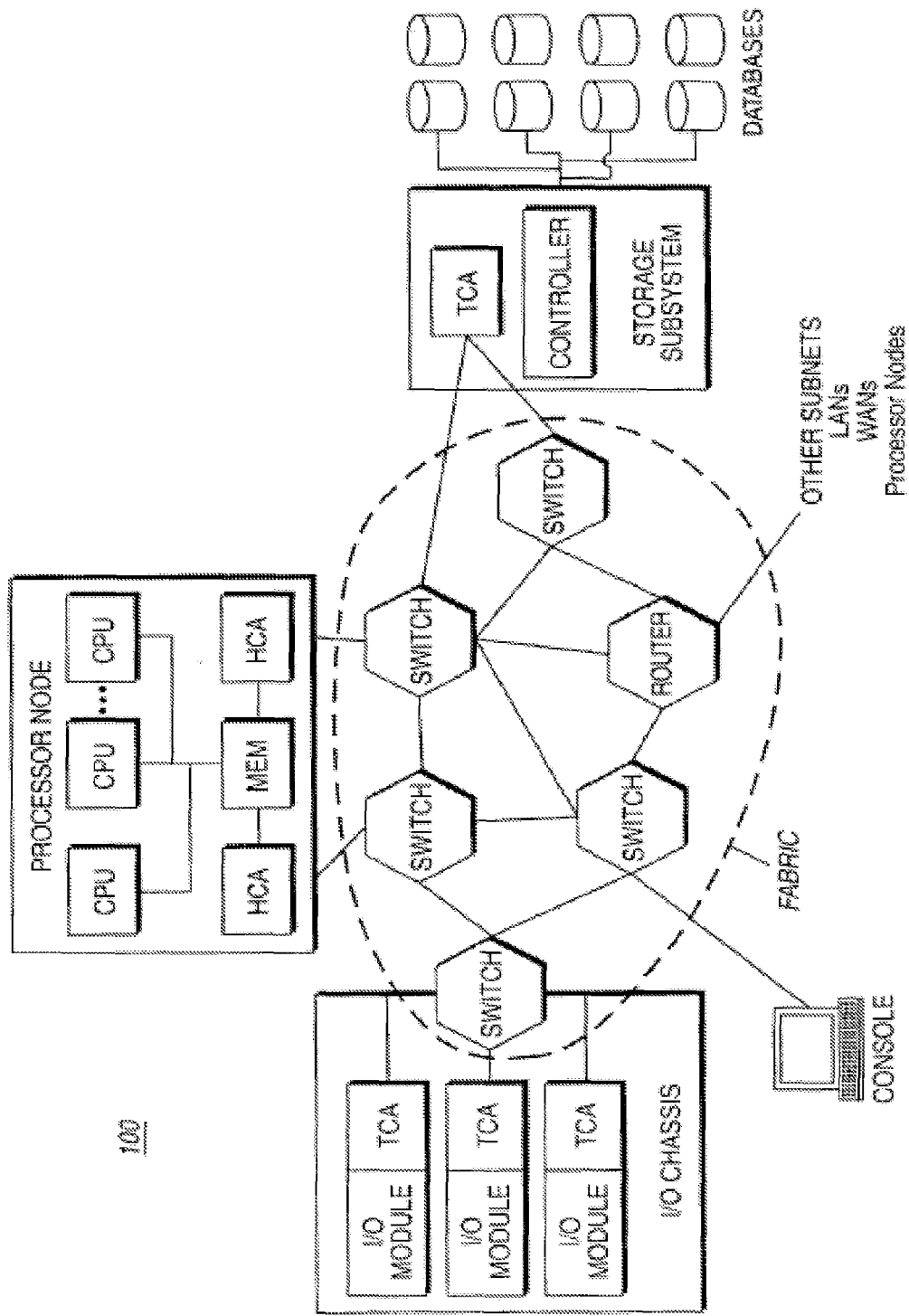
FIG. 1 is a high-level diagram of the Infiniband Architecture, according to the prior art.
Figure 2:
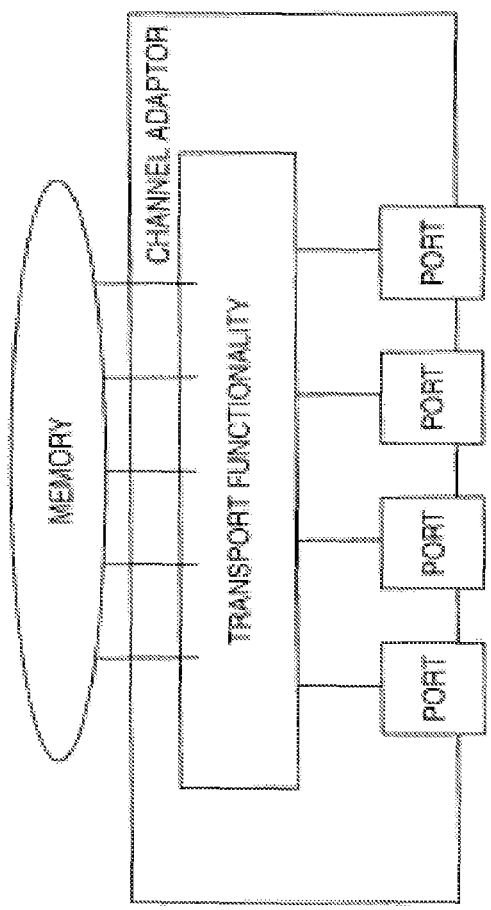
FIG. 2 is a high-level diagram of a channel adaptor, according to the prior art.
Figure 3:
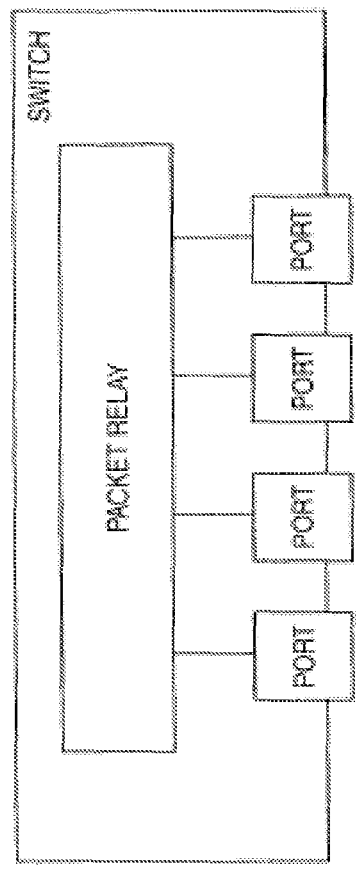
FIG. 3 is a high-level diagram of a switch, according to the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 4:
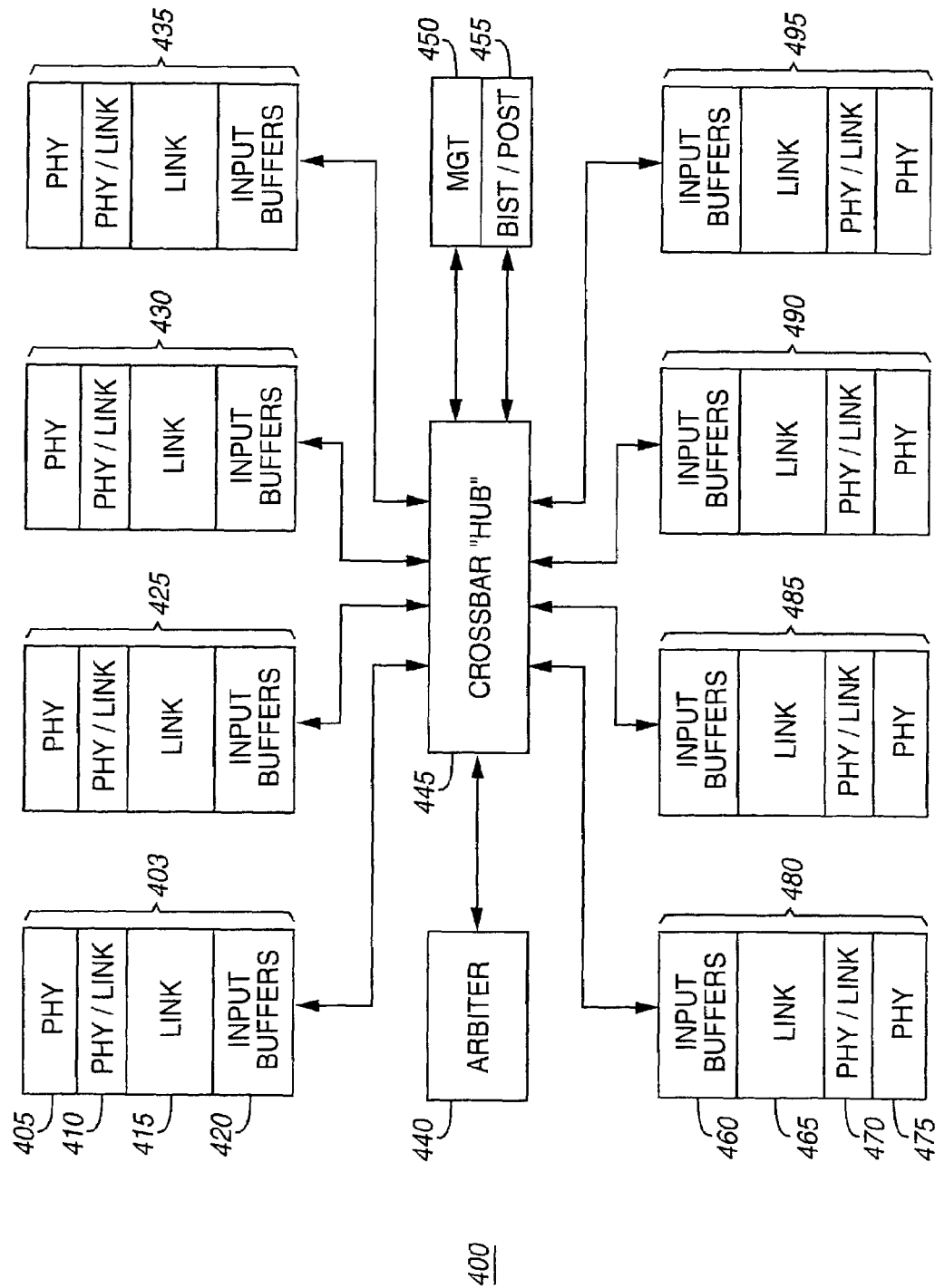
FIG. 4 is a block diagram of a switching architecture that implements the Infiniband architecture.

Referring to FIG. 4, a block diagram of a switching architecture 400 that implements the Infiniband architecture is shown. The switching architecture comprises ports 403, 425, 430, and 435, 480, 485, 490, and 495. Each port contains an input module and an output module. Although FIG. 4 shows eight ports corresponding to eight input modules and eight output modules, it is noted that one of skill in the art will recognize that more input modules, output modules, or ports could be used without departing from the spirit and scope of the present invention. Each port 403, 425, 430, 435, 480, 485, 490, and 495 comprises a PHY block (405 and block 460), a PHY/LINK block (410 and 465), a LINK block (415 and 470), and an INPUT BUFFER block (420 and 475). The PHY block 405 and PHY block 475 are operable to perform functions related to the physical operation of the switch. The PHY/LINK block 410 and PHY/LINK block 470 serve as the switch interface between the physical switch operation and the logical switch operation. The LINK block 415 and LINK block 465 contain the functionality related to the transfer of data to a remote location using crossbar 445. INPUT BUFFER 420 and INPUT BUFFER 460 perform the switch specific operations related to sending and receiving packets across the crossbar 445. Arbiter block 440 and MGT block 450 manage the requests for transport across the switch (arbitration) and ensure that the switch transports packets across the crossbar 445 without contention while meeting the requirements of data packets originated from a plurality of end users. In an embodiment of the present invention, BIST block 455 is also present and supports a built-in self-test functionality.

Figure 5:
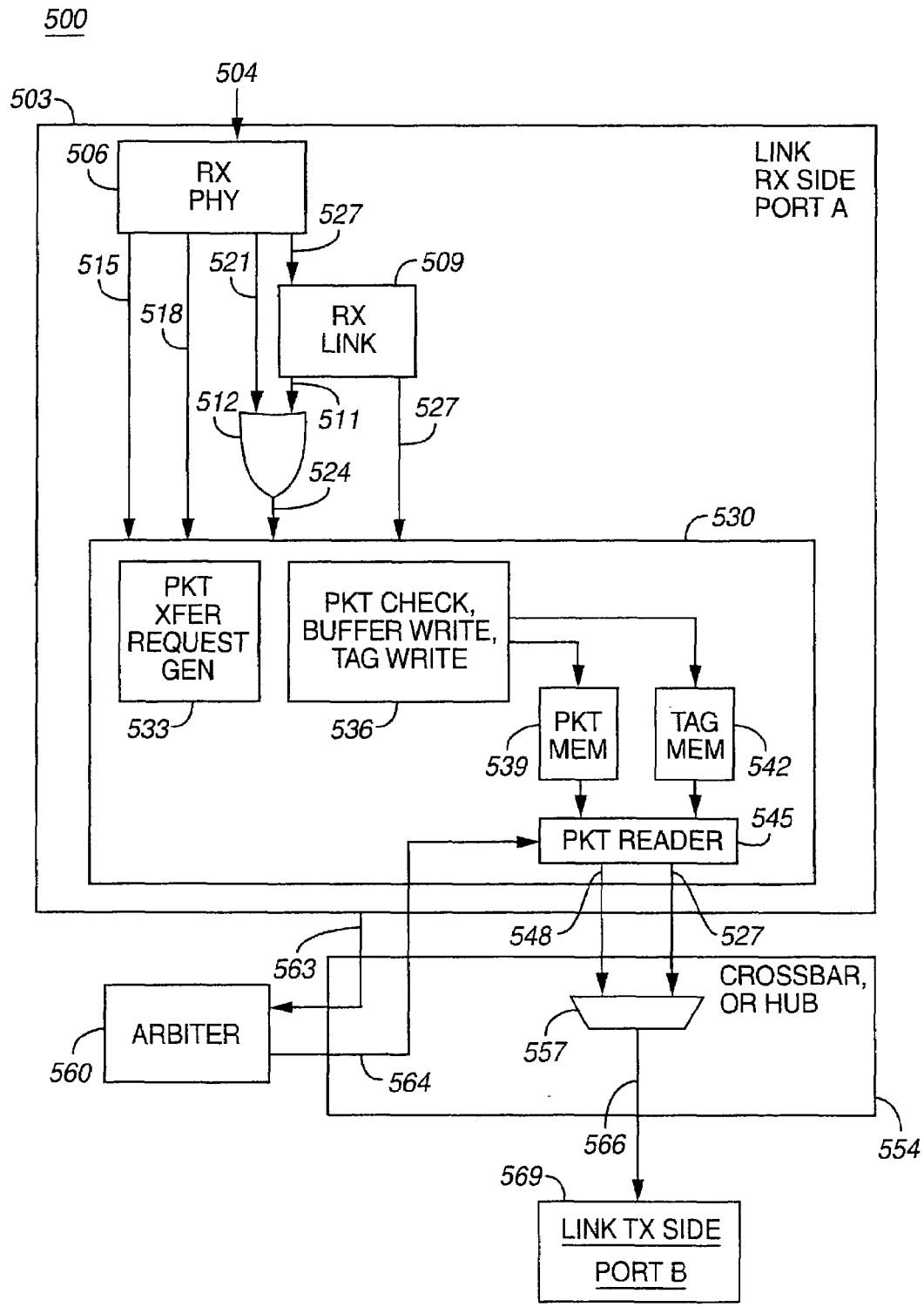
FIG. 5 is a block diagram of a structure for handling and discarding packets in a switched data network, in accordance with an embodiment of the present invention.

Referring now to FIG. 5, a block diagram of a structure for handling and discarding packets 500 in a switched data network is shown, in accordance with an embodiment of the present invention. A receive portion of a port 503 receives packet data 504 from a remote location. As the data 504 is received in Rx PHY block 506, a start of packet signal 515, end of packet signal 518 and packet symbol errors signal 521 are parsed by Rx PHY 506. Packet data 504 is concurrently passed to Rx Link block 509, which is operable to check the plurality of packet data 504 for correctness. If an error is detected, a protocol error signal 511 is asserted. The protocol error signal 511 and packet symbol errors signal 521 are coupled at OR gate 512 or other suitable selection or multiplexer (MUX) element. In this manner protocol errors and physical waveform errors can be detected and a packet processor 530 notified. One of skill in the art will recognize that the functionality of Rx PHY block 506 and Rx link block 509 could be combined or further separated without departing from the spirit and scope of the present invention.

Packet processor 530 receives the packet data 527, start of packet signal 515, end of packet signal 518, and an error signal 524 from the OR gate 512. Within the packet processor 530, the packet transfer request generator 533 initiates a request to transfer the data to a remote port 569. The packet transfer request 563 is coupled to a arbiter 560, which determines when and if the packet transfer request 563 is accepted. Concurrently, the packet is checked, the output buffer is written, and tag information is written as in block 536, block 539, and block 542. The tag information stored in tag mem block 542 is used by packet reader 545 to determine whether the plurality of packet data should be sent to remote port 569. Once packet reader 545 receives a packet transfer grant 564 from arbiter 560, the plurality of packet data 527, and a packet control signal 548 are multiplexed 557 within the crossbar 554 to create a packet data and control signal 566. Packet data and control signal 566 is coupled to port B of remote link 569. In a preferred embodiment of the present invention, packet data and control signal 566 contains a start packet field, an end good packet field, and an end bad packet field.

Figure 6:
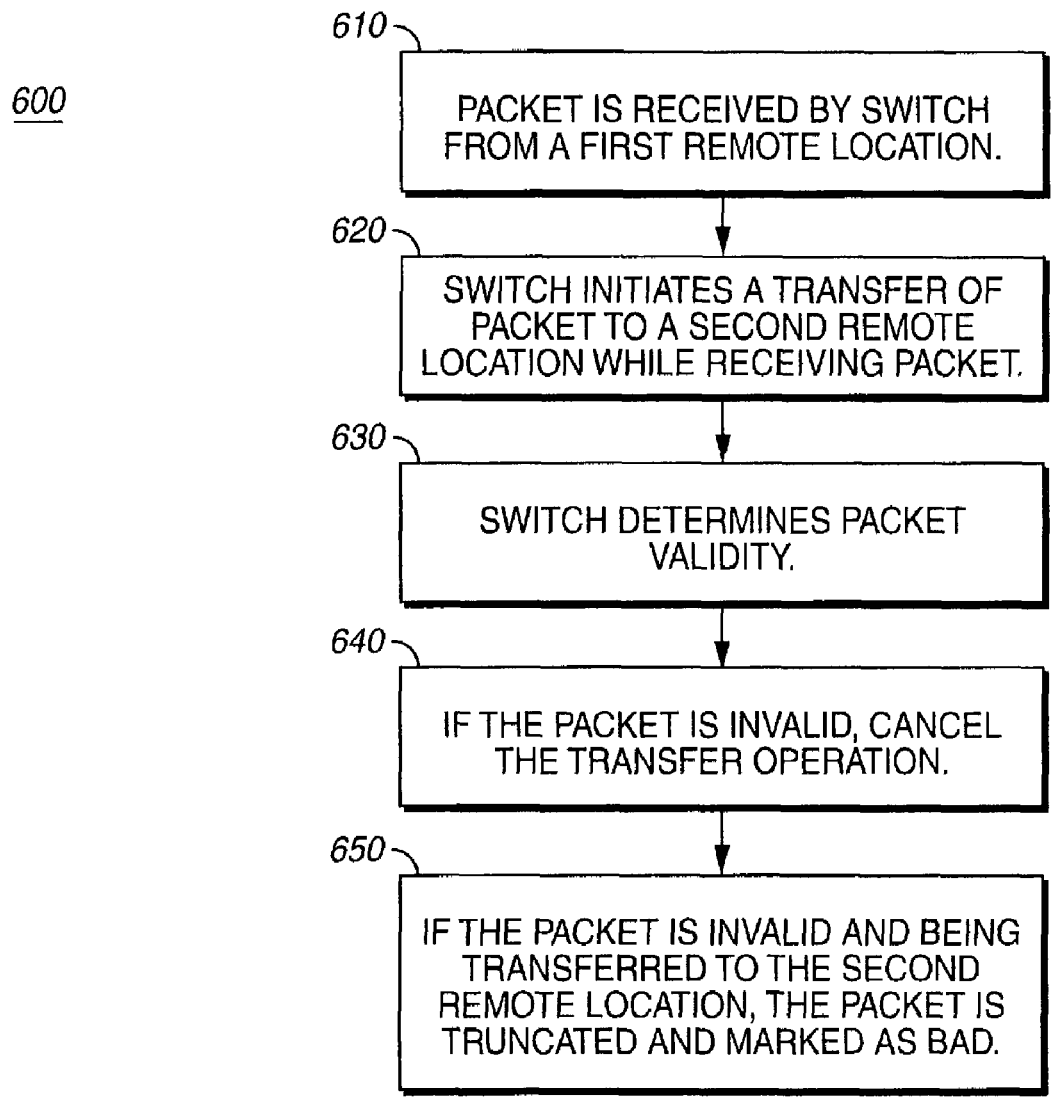
FIG. 6 is a flow diagram of a method for handling and discarding packets in the structure of FIG. 5, in accordance with an embodiment of the present invention.

Referring now to FIG. 6, a flow diagram 600 of a method for handling and discarding packets within the structure of FIG. 5 is shown, in accordance with an embodiment of the present invention. A packet sent from a first remote location is received by a switch in an Infiniband subnetwork as in block 610. The packet transfer request generator 533 of the switch initiates a transfer of the packet to a second remote location while the Rx PHY 506 is still receiving the packet from the first remote location (block 620). Note that in a certain embodiment of the present invention, the first remote location and the second remote location are instances of a source port and a destination port, respectively. After initiating the transfer, the Rx Link 509 of the switch determines the packet validity (block 630). If the packet is valid, then the transfer is allowed to complete. If the packet contains one or more errors, the switch cancels the transfer operation to the second remote location (block 640). In a preferred embodiment of the present invention, block 536 sets one or more tag parameters in tag memory 542 in order to cancel the transfer operation. If the transfer operation to the second remote destination has already been granted and the packet has been partially transferred to the second remote location, then the packet is truncated and an error tag contained in tag memory 542 is used to indicate to packet reader 545 that the packet is bad (block 650). In a preferred embodiment of the present invention, the transfer operation may be invalidated at one or more points during the transfer operation.

Because the switch may not be informed that a transfer request has been granted early enough to result in cut-thru operation, the switch may also support a store-and-forward transfer operation. A store-and-forward error packet comprises one or more parts of the packet transferred to an output link before being truncated and marked bad. Any remaining parts of the packet previously stored in the input buffer will be discarded and will not consume any output link bandwidth.

Figure 7:
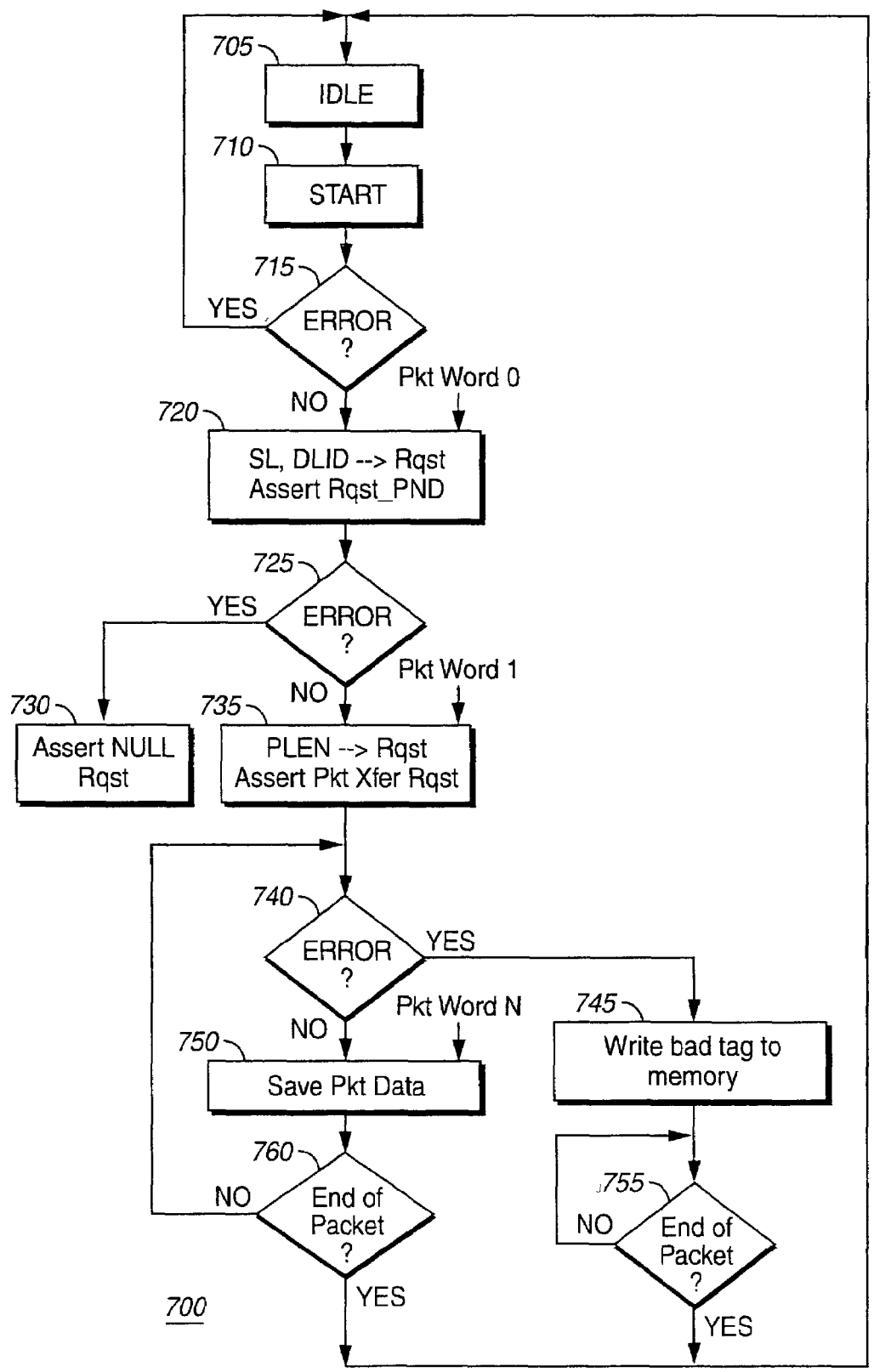
FIG. 7 is a detailed flow diagram of a method for handling and discarding packets in a switched data network, in accordance with an embodiment of the present invention.

Referring now to FIG. 7, a detailed flow diagram of the method for handling and discarding packets within the structure of FIG. 5 is shown, in accordance with an embodiment of the present invention. A link waiting to receive packet data is in an IDLE state (block 705) until an start of packet signal is received (block 710). If the start of the packet contains an error (block 715), then the link returns to the IDLE state (block 705). In a preferred embodiment of the present invention, Rx PHY 506 determines whether the packet contains an error in block 715. If the packet is not in error, then the first packet data is processed and a request to transfer the packet data is asserted (block 720). In a preferred embodiment of the present invention, the processing the first packet includes parsing a header of a first word of the packet data, said first word comprising a Virtual Lane ID, link version ID, service level, destination ID, and link next header. One word is 32 bits. If the first packet is in error (block 725), then a NULL request is asserted and further packets are ignored (block 730). If the first word of the packet is correct in block 725, then the first word is saved and then a second word of the packet data is processed and a packet transfer request is asserted (block 735). In a preferred embodiment of the present invention, the source local ID, and packet length are parsed in block 735. If the second word contains data errors or header errors (block 740), then a bad tag flag is written to tag memory 542 (block 745) and no more packet data is processed and the receive link checks for end of packet (block 755). When end of packet is reached after block 755, the receive link returns to IDLE state 705.

If the second word does not contain data or header errors, then the packet data is saved (block 750), and end of packet is checked (block 760). Each consecutive word is checked for packet errors and saved (blocks 740 and 750) until the end of packet is reached (block 760). In a preferred embodiment of the present invention, packet transfer request generator 533 contains a request state machine that is started after start of packet is received (block 710) and packet checker 536 contains a packet checking/storing state machine that is started after start of packet is received by the link (block 710). In a preferred embodiment of the present invention, the first word and second word are saved locally until the first two words are verified for correctness by the packet checker 536. In a preferred embodiment of the present invention, packet errors are determined by Rx Link 509, which provides an error signal acted upon by packet checker 536.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for handling and discarding, of packets in a packet data network, comprising:
   receiving one or more packets from one or more remote locations;
   initiating a transfer of a received packet of the one or more packets to a remote destination while the received packet of the one or more packets is being received;
   checking the received packet validity while the transfer of the received packet of the one or more packets to the remote destination is being initiated; and
   if the received packet of the one or more packets is invalid, canceling the transfer of the received packet of the one or more packets to the remote destination.

2. The method of claim 1, further comprising invalidating the transfer of the received packet of the one or more packets at one or more time instants during the transfer of the received packet.

3. The method of claim 1, wherein if an error tag is associated with the received packet of the one or more packets, further comprising truncating the received packet at the error corresponding to the error tag and marking the received packet as bad.

4. The method of claim 1, further comprising truncating the received packet during the transfer if an error is detected.

5. The method of claim 1, wherein checking the received packet validity further comprises parsing a header of the received packet.

6. The method of claim 5, wherein the header comprises a virtual lane ID field, a link version field, a service level field, a link next header field, a destination ID field, a packet length field, and a source local ID field.

7. The method of claim 5, wherein if an error is detected in a field of one or more fields of the header, asserting a NULL request and transferring no more packet data.

8. The method of claim 5, wherein if a packet length of the header is in error, writing a bad tag to a tag memory, said bad tag operable to halt the transfer of packet data.

9. The method of claim 1, wherein prior to transferring of packet data to the remote destination, storing one or more of the one or more packet data in a packet buffer.

10. The method of claim 9, further comprising storing a first two words of a packet of the one or more packets in a local memory until the received packet is checked for packet validity.

11. The method of claim 1, wherein if the received packet is in error and thus invalid, further comprising a store-and-forward error packet allowing one or more parts of the received packet to be transferred to an output link in a store-and-forward operation mode.

12. The method of claim 11, wherein during the store and forward operation mode if the received packet is in error, further comprising truncating and marking bad the received packet, thereby preventing more of the received packet from being transferred.

13. A method for the handling and discarding of packets in an Infiniband subnetwork, comprising:
receiving a start of packet signal from a first remote location;
checking a packet for transmission errors;
initiating a transfer of the packet to a second remote destination while the packet is being received;
validating a header of the packet while the transfer of the packet to the second remote destination is being initiated;
if a first word of the packet header is invalid canceling the initiation of the transfer of the packet to the second remote destination; and
if a second word of the packet header is invalid canceling the transfer of the packet to the second remote destination.

14. The method of claim 13, wherein the first remote location is a destination port of a first switch, and the second remote destination is a destination port of a second switch.

15. The method of claim 13, wherein if an error tag is associated with the packet, then the packet is truncated at the error and marked bad.

16. The method of claim 13, wherein the packet is truncated during the transfer process if an error is detected.

17. The method of claim 13, wherein prior to the transfer of packet data to the remote location, one or more of the one or more packet data are stored in a packet buffer.

18. The method of claim 13, wherein the header is contained in a first 2 words of the packet.

19. The method of claim 13, wherein the header comprises a virtual lane ID field, a link version field, a service level field, a link next header field, a destination ID field, a packet length field, and a source local ID field.

20. The method of claim 13, wherein if a packet length field of a header of the packet data is in error, a bad tag is written to a tag memory, said bad tag operable to stop the transfer of packet data.

21. The method of claim 13, wherein the first two words of the packet are stored in a local memory until the packet is checked for packet validity.

22. The method of claim 13, wherein if the packet is in error and thus invalid, further comprising a store-and-forward error packet allowing one or more parts of the packet to be transferred to an output link in a store-and-forward operation mode.

23. The method of claim 22, wherein during the store and forward operation mode if the packet is in error, further comprising truncating and marking bad the packet, thereby preventing more of said packet from being transferred.

24. A structure for the handling and discarding of packets in a switching subnetwork, comprising:
a local port;
a receive link coupled to the local port, said receive link operable to receive packet data and check the packet data for protocol errors and packet errors;
a packet processor coupled to the receive link, said packet processor being operable to (1) send a packet transfer request to transfer the packet data to a remote port of a remote switch while the packet process receives and validates the packet data and (2) abort the transfer of data if the receive link finds an error in the packet data;
a device operable to route the packet data from the packet processor to the remote port; and
an arbiter coupled to the packet processor and coupled to the remote port, wherein said arbiter is operable to receive the packet transfer request from the packet processor after the packet processor has begun validating the packet data and issue a grant to the packet processor in accordance with the remote port.

25. The structure of claim 24, wherein the switching subnetwork is an Infiniband subnetwork.

26. The structure of claim 24, wherein the packet processor further comprises:
a packet checker, operable to receive the packet data from the receive link and validate the packet data;
a packet reader coupled to the packet checker, operable to transfer the packet data to the remote port; and
a tag memory coupled to the packet checker and coupled to the packet reader, said tag memory operable to store a tag generated by the packet checker that indicates to the packet reader the packet validity.

27. The structure of claim 26, wherein the receive link checks a first two words of a packet for validity and provides an error signal to the packet checker.

28. The structure of claim 27, wherein the first two words comprise a virtual lane ID field, a link version field, a service level field, a link next header field, a destination ID field, a packet length field, and a source local ID field.

29. The structure of claim 28, wherein the service level field and destination ID field are parsed prior to initiating a transfer request to the remote port.

30. The structure of claim 24, wherein the packet processor asserts a NULL request if a first word of a packet is bad, thereby causing the packet to not be transferred to the remote port.

31. The structure of claim 30, wherein the NULL request is generated if the service level field or local destination field of the first word of the packet are in error.

32. The structure of claim 26, wherein the packet checker sets a bad tag if a second word of the packet is bad, thereby halting the transfer of the remainder of the packet to the remote port.

33. The structure of claim 32, wherein less than six bad data words are transferred to the remote port prior to halting the transfer of the packet to the remote port.

* * * * *

UNITED STATES PATENT AND TRADEMARK OFFICE
CERTIFICATE OF CORRECTION

| | |
|---|---|
| PATENT NO. | : 7,315,542 B2 |
| APPLICATION NO. | : 10/261012 |
| DATED | : January 1, 2008 |
| INVENTOR(S) | : Mercedes E. Gil et al. |

It is certified that error appears in the above-identified patent and that said Letters Patent is hereby corrected as shown below:

Column 7, Line 33, Claim 17, delete "location," and insert -- destination, --.

Signed and Sealed this

Eighth Day of June, 2010

David J. Kappos
*Director of the United States Patent and Trademark Office*